(12) United States Patent
Kishimoto et al.

(10) Patent No.: US 10,011,265 B2
(45) Date of Patent: Jul. 3, 2018

(54) HYBRID VEHICLE AND METHOD FOR CONTROLLING THE SAME

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Takeshi Kishimoto, Nagakute (JP); Masaya Amano, Toyota (JP); Takashi Ando, Nisshin (JP); Yu Shimizu, Nagakute (JP); Wataru Nagashima, Kariya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 74 days.

(21) Appl. No.: 15/340,110

(22) Filed: Nov. 1, 2016

(65) Prior Publication Data
US 2017/0120891 A1    May 4, 2017

(30) Foreign Application Priority Data
Nov. 2, 2015 (JP) ................................. 2015-215610

(51) Int. Cl.
*B60W 20/13* (2016.01)
*B60W 20/14* (2016.01)
(Continued)

(52) U.S. Cl.
CPC ............ *B60W 20/13* (2016.01); *B60K 6/445* (2013.01); *B60L 11/08* (2013.01); *B60L 11/123* (2013.01); *B60L 11/14* (2013.01); *B60L 11/1803* (2013.01); *B60W 20/14* (2016.01); *B60W 20/50* (2013.01); *B60K 6/365* (2013.01); *B60L 2210/30* (2013.01); *B60L 2240/423* (2013.01); *B60L 2240/527* (2013.01); *B60W 2540/10* (2013.01);
(Continued)

(58) Field of Classification Search
None
See application file for complete search history.

(56) References Cited

U.S. PATENT DOCUMENTS

| 8,140,207 | B2 * | 3/2012 | Nozaki | B60W 20/30 |
| | | | | 180/65.21 |
| 8,342,273 | B2 * | 1/2013 | Takahashi | B60K 6/365 |
| | | | | 180/65.275 |

(Continued)

FOREIGN PATENT DOCUMENTS

JP    2013-203116    10/2013

*Primary Examiner* — Todd Melton
*Assistant Examiner* — Jason R Roberson
(74) *Attorney, Agent, or Firm* — Finnegan, Henderson, Farabow, Garrett & Dunner LLP

(57) ABSTRACT

Inverterless running control is control in which an inverter is set to a gate cut-off state, an engine is driven to mechanically rotate a motor-generator and to generate in the motor-generator, counter-electromotive torque in accordance with a difference between a counter-electromotive voltage of the motor-generator and a system voltage, and a vehicle runs with drive torque applied to an output shaft as reaction force of the counter-electromotive torque. An ECU controls drive torque to produce driving force determined by an accelerator position by raising or lowering the system voltage during inverterless running control.

3 Claims, 12 Drawing Sheets

(51) Int. Cl.
*B60K 6/445* (2007.10)
*B60L 11/08* (2006.01)
*B60L 11/12* (2006.01)
*B60L 11/14* (2006.01)
*B60L 11/18* (2006.01)
*B60W 20/50* (2016.01)
*B60K 6/365* (2007.10)

(52) U.S. Cl.
CPC .... *B60W 2710/083* (2013.01); *B60Y 2200/92* (2013.01); *B60Y 2300/69* (2013.01); *B60Y 2400/112* (2013.01); *B60Y 2400/604* (2013.01); *B60Y 2400/61* (2013.01); *B60Y 2400/73* (2013.01); *Y02T 10/6217* (2013.01); *Y02T 10/642* (2013.01); *Y02T 10/7005* (2013.01); *Y02T 10/7077* (2013.01); *Y02T 10/7241* (2013.01); *Y10S 903/907* (2013.01)

(56) References Cited

U.S. PATENT DOCUMENTS

| | | | |
|---|---|---|---|
| 2009/0243554 A1* | 10/2009 | Gu | B60K 6/48 320/162 |
| 2010/0121512 A1* | 5/2010 | Takahashi | B60K 6/365 701/22 |
| 2015/0280546 A1* | 10/2015 | Kouno | H02M 1/36 363/132 |
| 2017/0088125 A1* | 3/2017 | Shimizu | B60W 20/50 |
| 2017/0106852 A1* | 4/2017 | Ando | B60K 6/365 |
| 2017/0113680 A1* | 4/2017 | Shimizu | B60K 6/26 |
| 2017/0267231 A1* | 9/2017 | Takakura | B60W 20/40 |

* cited by examiner ated by change in state of combustion in the engine, such change is relatively gradual. Therefore, when the engine operation point is adjusted such that drive torque attains to a value in accordance with requested driving force at the time when driving force determined by an accelerator position in response to an operation by a user (requested driving force) is varied during inverterless running control, sufficient responsiveness may not be obtained.

HYBRID VEHICLE AND METHOD FOR CONTROLLING THE SAME

This nonprovisional application is based on Japanese Patent Application No. 2015-215610 filed with the Japan Patent Office on Nov. 2, 2015, the entire contents of which are hereby incorporated by reference.

BACKGROUND OF THE INVENTION

Field of the Invention

The present invention relates to a hybrid vehicle and a method for controlling the same, and more particularly to a hybrid vehicle which can run with motive power from at least one of an engine and a rotating electric machine and a method for controlling the same.

Description of the Background Art

A configuration of a hybrid vehicle including an engine, first and second motor-generators, and a planetary gear mechanism has been known. The planetary gear mechanism includes a sun gear coupled to the first motor-generator, a ring gear coupled to the second motor-generator, and a carrier coupled to the engine. An electric system of the hybrid vehicle includes a battery and an inverter. The inverter is configured to convert power among the battery, the first motor-generator, and the second motor-generator.

In a hybrid vehicle configured as such, when the first and second motor-generators cannot normally electrically be driven by the inverter, appropriate measures should be taken for protecting devices. For example, Japanese Patent Laying-Open No. 2013-203116 discloses control for cutting off a gate of an inverter when first and second motor-generators cannot normally electrically be driven by the inverter.

SUMMARY OF THE INVENTION

Control in which the vehicle runs with a limp home function with the inverter being set to a gate cut-off state and the engine being driven when the first and second motor-generators cannot normally electrically be driven by the inverter as described above is herein referred to as "inverterless running control." During inverterless running control, a counter-electromotive voltage is generated in the first motor-generator by mechanically rotating the first motor-generator with rotational force of the engine while the inverter is set to the gate cut-off state. Here, the first motor-generator generates braking torque (counter-electromotive torque) applied in a direction interfering rotation of the first motor-generator. As counter-electromotive torque is applied from the first motor-generator to the sun gear, drive torque applied in a positive direction is generated in the ring gear as reaction force of the counter-electromotive torque. With drive torque, running with a limp home function is realized.

For example, Japanese Patent Laying-Open No. 2013-203116 discloses calculation of requested engine power in accordance with an accelerator position during inverterless running control and drive of the engine at an engine operation point determined based on the requested engine power. Though details will be described later, desired drive torque can be generated by controlling an engine rotation speed.

In general, mechanical control is often lower in responsiveness than electrical or electronic control. Since change in engine operation point (change in engine rotation speed here) is brought about by mechanical control accompanied by change in state of combustion in the engine, such change is relatively gradual. Therefore, when the engine operation point is adjusted such that drive torque attains to a value in accordance with requested driving force at the time when driving force determined by an accelerator position in response to an operation by a user (requested driving force) is varied during inverterless running control, sufficient responsiveness may not be obtained.

The present invention was made to solve the problems above, and an object of the present invention is to improve responsiveness to requested driving force in a hybrid vehicle configured to carry out inverterless running control.

A hybrid vehicle according to one aspect of the present invention includes an engine, a first rotating electric machine including a permanent magnet in a rotor, an output shaft connected to a drive wheel, a planetary gear mechanism, a second rotating electric machine connected to the output shaft, a battery, a converter, an inverter, and a controller. The planetary gear mechanism is configured to mechanically couple the engine, the first rotating electric machine, and the output shaft to one another and to transmit torque among the engine, the first rotating electric machine, and the output shaft. The converter is configured to output a boosted voltage which results from boost of a voltage input from the battery. The inverter is configured to convert power among the converter, the first rotating electric machine, and the second rotating electric machine. The controller is configured to carry out inverterless running control when the first and second rotating electric machines cannot normally be driven by the inverter. Inverterless running control is control in which the inverter is set to a gate cut-off state, the engine is driven to mechanically rotate the first rotating electric machine and to generate in the first rotating electric machine, braking torque in accordance with a difference between a counter-electromotive voltage of the first rotating electric machine and the boosted voltage, and the hybrid vehicle is run with drive torque applied to the output shaft as reaction force of the braking torque. The controller controls the drive torque to produce driving force determined by an accelerator position by raising or lowering the boosted voltage during the inverterless running control.

In a method for controlling a hybrid vehicle according to another aspect of the present invention, the hybrid vehicle includes an engine, a first rotating electric machine including a permanent magnet in a rotor, an output shaft connected to a drive wheel, a planetary gear mechanism configured to mechanically couple the engine, the first rotating electric machine, and the output shaft to one another and to transmit torque among the engine, the first rotating electric machine, and the output shaft, a second rotating electric machine connected to the output shaft, a battery, a converter configured to output a boosted voltage which results from boost of a voltage input from the battery, and an inverter configured to convert power among the converter, the first rotating electric machine, and the second rotating electric machine. The method includes carrying out inverterless running control when the first and second rotating electric machines cannot normally be driven by the inverter. Inverterless running control is control in which the inverter is set to a gate cut-off state, the engine is driven to mechanically rotate the first rotating electric machine and to generate in the first rotating electric machine, braking torque in accordance with a difference between a counter-electromotive voltage of the first rotating electric machine and the boosted voltage, and the hybrid vehicle is run with drive torque applied to the output shaft as reaction force of the braking torque. The carrying out inverterless running control includes controlling the drive torque to produce driving force determined by an accelerator position by raising or lowering the boosted voltage.

In the first rotating electric machine, electric power (counter-electromotive force) in accordance with a difference between a counter-electromotive voltage and a boosted voltage is generated and braking torque (counter-electromotive torque) in accordance with the counter-electromotive force is generated. Then, drive torque as reaction force of counter-electromotive torque is applied to the output shaft. Magnitude of drive torque is determined by the voltage difference. According to such a configuration, the voltage difference is adjusted by adjusting the boosted voltage so that magnitude of drive torque can be controlled. In general, electrical control of a converter or the like is higher in responsiveness than mechanical control of an engine or the like. Therefore, responsiveness to requested driving force can be improved by controlling magnitude of drive torque by control of the converter.

The controller includes a first control unit configured to control the engine and a second control unit configured to control the converter. During inverterless running control, the second control unit controls the drive torque to produce driving force determined by the accelerator position by raising or lowering the boosted voltage when communication between the first control unit and the second control unit is normal, whereas the first control unit controls the drive torque to produce driving force determined by the accelerator position by adjusting an operation point of the engine when the communication is not normal.

According to the configuration, when the first and second rotating electric machines cannot normally be driven and inverterless running control is carried out, control of drive torque is switched depending on whether or not communication is normal. When communication is normal, drive torque is controlled by adjusting a boosted voltage, and hence responsiveness to requested driving force can be improved. Since the first control unit can control the engine without establishing communication, drive torque is controlled by adjustment of a rotation speed of the engine by the first control unit when communication is not normal. Since inverterless running can thus continue in spite of occurrence of a communication error, a hybrid vehicle can more reliably run with a limp home function to a location desired by a user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
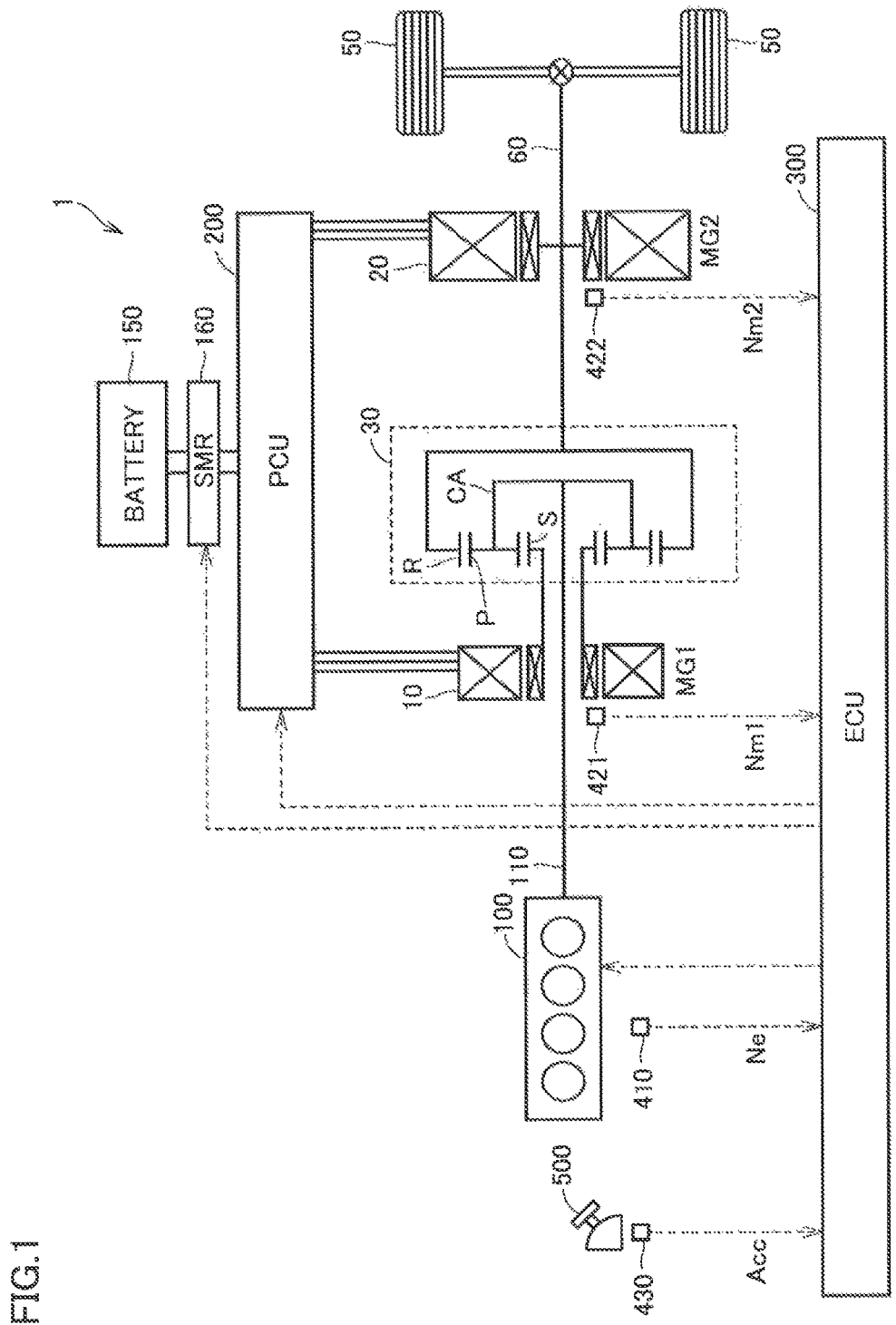
FIG. 1 is a block diagram schematically showing an overall configuration of a hybrid vehicle according to a first embodiment.

An embodiment of the present invention will be described hereinafter in detail with reference to the drawings. The same or corresponding elements in the drawings have the same reference characters allotted and description thereof will not be repeated.

First Embodiment

<Overall Configuration of Hybrid Vehicle>

FIG. 1 is a block diagram schematically showing an overall configuration of a hybrid vehicle according to the present embodiment. A vehicle 1 includes an engine 100, motor-generators 10 and 20, a planetary gear mechanism 30, a drive wheel 50, an output shaft 60 connected to drive wheel 50, a battery 150, a system main relay (SMR) 160, a power control unit (PCU) 200, an electronic control unit (ECU) 300, and an accelerator pedal 500.

Vehicle 1 runs with motive power from at least one of engine 100 and motor-generator 20. Vehicle 1 can switch a manner of running of vehicle 1 between electric vehicle running (EV running) in which motive power from motor-generator 20 is used without using motive power from engine 100 and a hybrid vehicle running (HV running) in which motive power from both of engine 100 and motor-generator 20 is used during normal running which will be described later.

Engine 100 is an internal combustion engine such as a gasoline engine or a diesel engine. Engine 100 generates motive power for vehicle 1 to run in response to a control signal from ECU300. Motive power generated by engine 100 is output to planetary gear mechanism 30.

Engine 100 is provided with an engine rotation speed sensor 410. Engine rotation speed sensor 410 detects a rotation speed Ne of engine 100 and outputs a signal indicating a result of detection to ECU 300.

Each of motor-generators 10 and 20 is, for example, a three-phase alternating current (AC) permanent magnet synchronous motor. Motor-generator (a first rotating electric machine) 10 rotates a crankshaft 110 of engine 100 with electric power from battery 150 in starting engine 100. Motor-generator 10 can also generate power by using motive power from engine 100. AC power generated by motor-generator 10 is converted to direct current (DC) power by PCU 200 and battery 150 is charged with DC power. AC power generated by motor-generator 10 may be supplied to motor-generator 20.

A rotor of motor-generator (a second rotating electric machine) 20 is coupled to output shaft 60. Motor-generator 20 rotates output shaft 60 with at least one of electric power supplied from battery 150 and electric power generated by motor-generator 10. Motor-generator 20 can also generate power through regenerative braking. AC power generated by motor-generator 20 is converted to DC power by PCU 200 and battery 150 is charged with DC power.

Motor-generator 10 is provided with a resolver 421. Resolver 421 detects a rotation speed Nm1 of motor-generator 10 and outputs a signal indicating a result of detection to ECU 300. Similarly, motor-generator 20 is provided with a resolver 422. Resolver 422 detects a rotation speed Nm2 of motor-generator 20 and outputs a signal indicating a result of detection to ECU 300. ECU 300 calculates a speed V of vehicle 1 (a vehicle speed) based on rotation speed Nm2.

Planetary gear mechanism 30 is constructed to mechanically couple engine 100, motor-generator 10, and output shaft 60 to one another and to transmit torque among engine 100, motor-generator 10, and output shaft 60. Specifically, planetary gear mechanism 30 includes a sun gear S, a ring gear R, a carrier CA, and a pinion gear P as rotational elements. Sun gear S is coupled to the rotor of motor-generator 10. Ring gear R is coupled to output shaft 60. Pinion gear P is engaged with sun gear S and ring gear R. Carrier CA is coupled to crankshaft 110 of engine 100 and holds pinion gear P such that pinion gear P can rotate and revolve.

Battery 150 is a power storage device configured to be rechargeable. Battery 150 representatively includes such a secondary battery as a nickel metal hydride secondary battery or a lithium ion secondary battery or a capacitor such as an electric double layer capacitor.

SMR 160 is connected to a power line connecting battery 150 and PCU 200 to each other. SMR 160 is opened or closed in response to a control signal from ECU 300. Switching between an electrically connected state and a disconnected state between battery 150 and PCU 200 is thus made.

PCU 200 boosts DC power stored in battery 150, converts the boosted voltage to an AC voltage, and supplies the resultant AC voltage to motor-generators 10 and 20. PCU 200 converts AC power generated by motor-generators 10 and 20 into DC power and supplies resultant DC power to battery 150. A configuration of PCU 200 will be described in detail with reference to FIG. 2.

Though not shown, ECU 300 includes a central processing unit (CPU), a memory, and an input and output buffer. ECU 300 controls each device such that vehicle 1 achieves a desired running state based on signals from each sensor and devices and a map and a program stored in the memory. Various types of control are not limited to processing by software but can also be processed by dedicated hardware (electronic circuits).

An accelerator position sensor 430 is provided for accelerator pedal 500. Accelerator position sensor 430 detects an amount of operation (an accelerator position) Acc of accelerator pedal 500 in response to an operation by a user and outputs a result of detection to ECU 300. ECU 300 calculates requested driving force in vehicle 1 based on accelerator position Acc and vehicle speed V.

<Configuration of Electric System>

Figure 2:
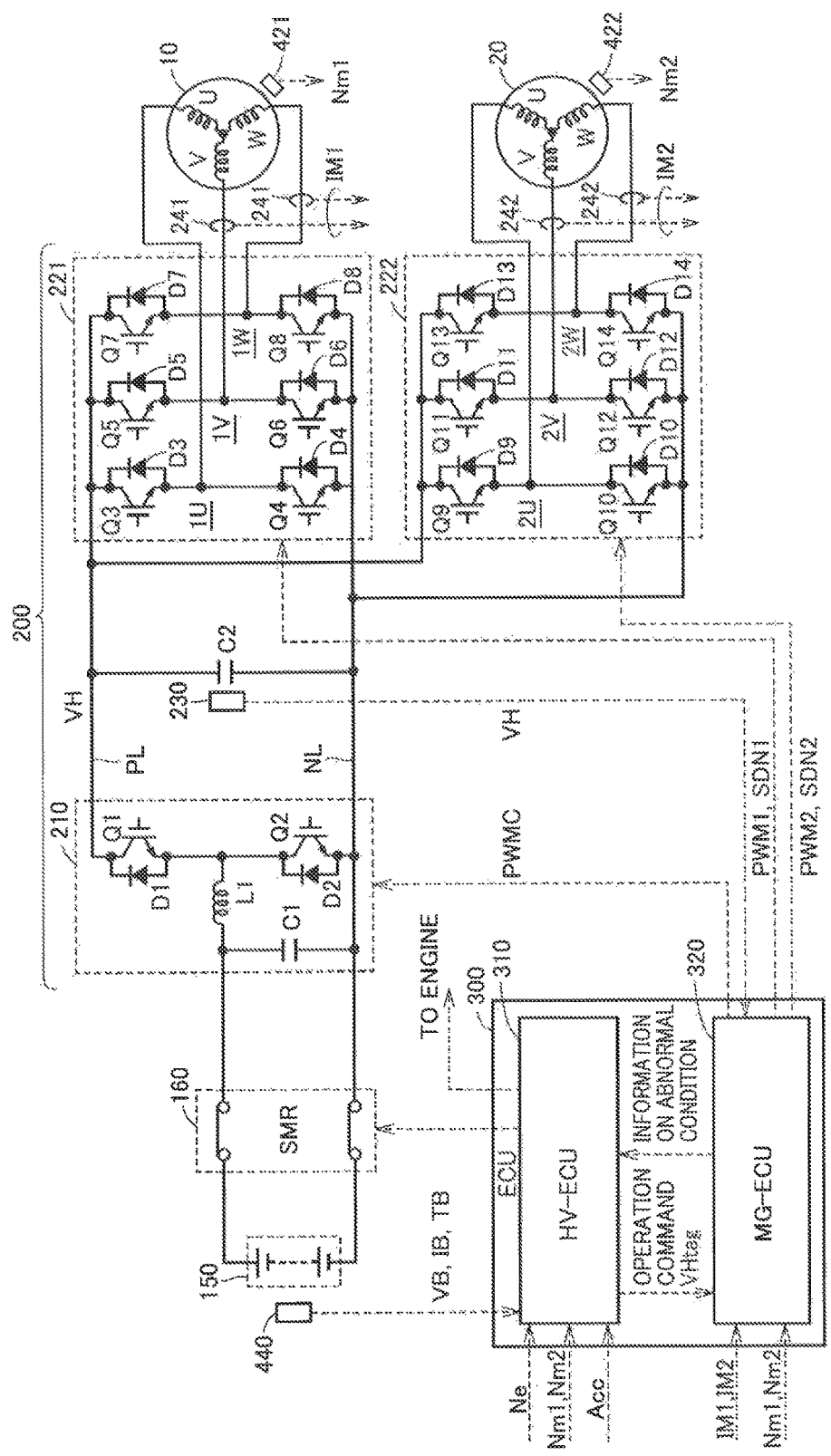
FIG. 2 is a circuit block diagram for illustrating a configuration of an electric system of the hybrid vehicle.

FIG. 2 is a circuit block diagram for illustrating a configuration of the electric system of vehicle 1. PCU 200 includes a capacitor C1, a converter 210, a capacitor C2, inverters 221 and 222, a voltage sensor 230, and current sensors 241 and 242. ECU 300 includes an HV-ECU 310 and an MG-ECU 320.

A monitoring unit 440 is provided for battery 150. Monitoring unit 440 detects a voltage VB of battery 150, a current IB input to and output from battery 150, and a temperature TB of battery 150, and outputs a signal indicating a result of detection to HV-ECU 310.

Capacitor C1 is connected in parallel to battery 150. Capacitor C1 smoothens voltage VB of battery 150 and supplies the smoothened voltage to converter 210.

Converter 210 includes a reactor L1, switching elements Q1 and Q2, and diodes D1 and D2. Each of switching elements Q1 and Q2 and switching elements Q3 to Q14 which will be described later is, for example, an insulated gate bipolar transistor (IGBT). Switching elements Q1 and Q2 are connected in series to each other between a power line PL and a power line NL connecting converter 210 and inverter 221 to each other. Diodes D1 and D2 are connected in anti-parallel between collectors and emitters of switching elements Q1 and Q2, respectively. Reactor L1 has one end connected to a high potential side of battery 150 and the other end connected to a point intermediate between switching element Q1 and switching element Q2 (a point of connection between the emitter of switching element Q1 and the collector of switching element Q2).

Converter 210 boosts voltage VB of battery 150 in response to a control signal PWMC under a pulse width modulation (PWM) scheme for having each of switching elements Q1 and Q2 perform a switching operation and supplies the boosted voltage to power lines PL and NL. Converter 210 down-converts a DC voltage of power lines PL and NL supplied from one or both of inverter 221 and inverter 222 in response to control signal PWMC so that battery 150 is charged.

Capacitor C2 is connected in parallel to converter 210. Capacitor C2 smoothens a DC voltage supplied from converter 210 and supplies the resultant DC voltage to inverters 221 and 222.

Voltage sensor 230 detects a voltage across opposing ends of capacitor C2, that is, a voltage (hereinafter also denoted as a "system voltage") VH between power line PL and power line NL and outputs a signal indicating a result of detection to MG-ECU 320. System voltage VH corresponds to the "boosted voltage" according to the present invention.

Inverter 221 includes a U-phase arm 1U, a V-phase arm 1V, and a W-phase arm 1W. Arms of these phases are connected in parallel to one another between power line PL and power line NL. U-phase arm 1U includes switching elements Q3 and Q4 connected in series to each other. V-phase arm 1V includes switching elements Q5 and Q6 connected in series to each other. W-phase arm 1W includes switching elements Q7 and Q8 connected in series to each other. Diodes D3 to D8 are connected in anti-parallel between collectors and emitters of switching elements Q3 to Q8, respectively. An intermediate point of the arm of each phase is connected to a coil of each phase of motor-generator 10. One ends of three coils of the U-phase, the V-phase, and the W-phase of motor-generator 10 are commonly connected to a neutral point. The U-phase coil has the other end connected to a point intermediate between switching elements Q3 and Q4. The V-phase coil has the other end connected to a point intermediate between switching elements Q5 and Q6. The W-phase coil has the other end connected to a point intermediate between switching elements Q7 and Q8.

When inverter 221 is supplied with system voltage VH, inverter 221 converts the DC voltage to an AC voltage in response to a control signal PWM1 under the PWM scheme for having each of switching elements Q3 to Q8 perform a switching operation and drives motor-generator 10. Thus, motor-generator 10 is driven to generate torque designated by a torque command value. When inverter 221 receives a gate cut-off signal SDN1, inverter 221 renders each of switching elements Q3 to Q8 non-conducting. Inverter 221 is thus set to the gate cut-off state. Since inverter 222 is basically equivalent in configuration to inverter 221, detailed description will not be repeated.

Current sensor 241 detects a current (hereinafter also denoted as a motor current) IM1 which flows to motor-generator 10 and outputs a signal indicating a result of detection to MG-ECU 320. A direction from motor-generator 10 toward battery 150 is herein defined as a positive direction of motor current IM1. Similarly to current sensor 241, current sensor 242 detects a current IM2 which flows to motor-generator 20 and outputs a signal indicating a result of detection to MG-ECU 320.

HV-ECU 310 receives a signal from engine rotation speed sensor 410 (denoted as Ne), signals from resolvers 421 and 422 (denoted as Nm1 and Nm2, respectively), and a signal from accelerator position sensor 430 (denoted as Acc).

HV-ECU 310 generates an operation command for motor-generators 10 and 20 and outputs the command to MG-ECU 320. The operation command includes an operation permission command and an operation prohibition command for each of motor-generators 10 and 20 (that is, a command to cut off gates of inverters 221 and 222), a torque command value for each of motor-generators 10 and 20, and a command value for each of rotation speeds Nm1 and Nm2. HV-ECU 310 sets a target value for an output voltage from converter 210 (hereinafter also referred to as a "target system voltage") VHtag and outputs a signal indicating the value to MG-ECU 320.

HV-ECU 310 calculates requested driving force based on accelerator position Acc and vehicle speed V and determines requested engine power Pe* based on requested driving force. HV-ECU 310 controls fuel injection, ignition timing, and valve timing of engine 100 such that engine 100 is driven at an operation point determined based on requested engine power Pe* (a target rotation speed Netag and target torque of engine 100).

MG-ECU 320 receives operation commands for motor-generators 10 and 20 and target system voltage VHtag from HV-ECU 310. MG-ECU 320 receives a signal from voltage sensor 230 (denoted as VH), signals from current sensors 241 and 242 (denoted as IM1 and IM2, respectively), and signals from resolvers 421 and 422 (denoted as Nm1 and Nm2, respectively).

MG-ECU 320 controls converter 210 such that system voltage VH follows target system voltage VHtag based on each command value, target system voltage VHtag, and each signal. More specifically, MG-ECU 320 carries out feedback control for controlling system voltage VH to target system voltage VHtag by adjusting duty of an output voltage from converter 210 in accordance with control signal PWMC. Duty of the output voltage from converter 210 can be adjusted by varying operation timing of switching elements Q1 and Q2 of converter 210.

MG-ECU 320 controls inverters 221 and 222 such that motor-generators 10 and 20 operate in response to an operation command received from HV-ECU 310. When MG-ECU 320 receives an operation permission command for motor-generator 10 from HV-ECU 310, MG-ECU 320 generates control signal PWM1 based on system voltage VH, motor current IM1, and the torque command value and outputs the control signal to inverter 221. When MG-ECU 320 receives a command to cut off the gate of inverter 221 from HV-ECU 310, MG-ECU 320 generates gate cut-off signal SDN1 and outputs the gate cut-off signal to inverter 221. Since control of inverter 222 is also similar, description will not be repeated.

Though ECU 300 is divided into 2 units (HV-ECU 310 and MG-ECU 320) in the example shown in FIG. 2, the two units can also be integrated into one unit. When HV-ECU 310 and MG-ECU 320 are not distinguished from each other, they are hereinafter simply denoted as "ECU 300."

<Normal Mode and Limp Home Mode>

ECU 300 can allow vehicle 1 to run in any control mode of a normal mode and a limp home mode. The normal mode is a mode in which vehicle 1 runs with switching between EV running and HV running being made as necessary. In other words, the normal mode is a mode in which electrical drive of motor-generators 10 and 20 by inverters 221 and 222 is allowed. Running in the normal mode is referred to as "normal running."

The limp home mode is a mode in which vehicle 1 runs with a limp home function by driving engine 100 while inverters 221 and 222 are set to a gate cut-off state when motor-generators 10 and 20 cannot normally electrically be driven by inverters 221 and 222 due to failure of a component (such as resolvers 421 and 422 or current sensors 241 and 242). In other words, the limp home mode is a mode in which electrical drive of motor-generators 10 and 20 by inverters 221 and 222 is prohibited. Running in the limp home mode is referred to as "inverterless running" and control for inverterless running is referred to as "inverterless running control."

Figure 3:
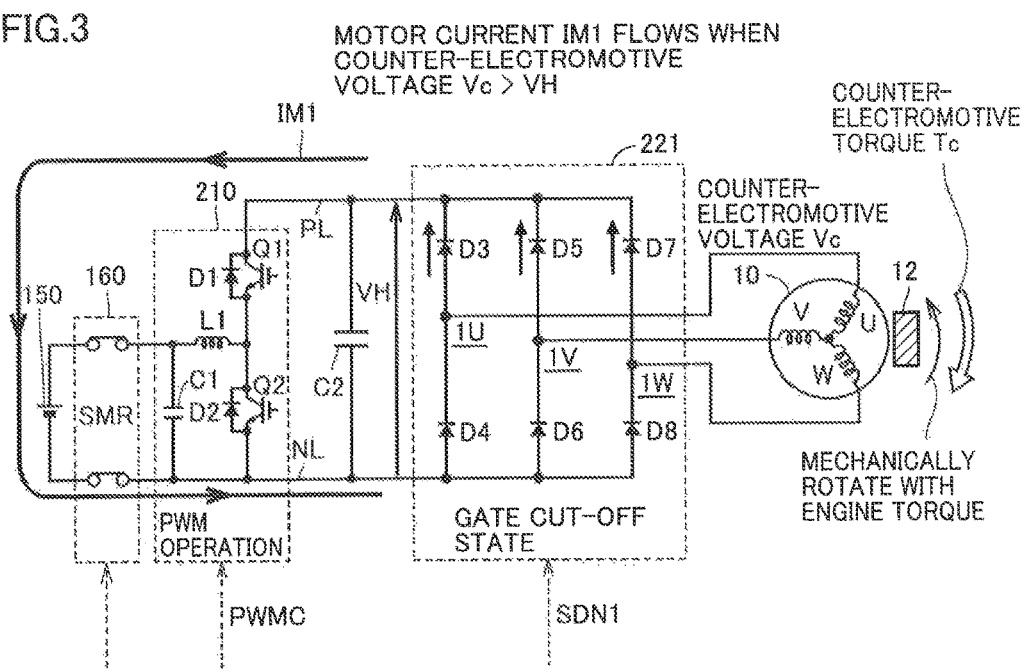
FIG. 3 is a diagram schematically showing the configuration of the electric system during inverterless running control.

FIG. 3 is a diagram schematically showing a configuration of the electric system during inverterless running control. During inverterless running control, in response to gate cut-off signal SDN1, all switching elements Q3 to Q8 included in inverter 221 are rendered non-conducting. Therefore, diodes D3 to D8 included in inverter 221 implement a three-phase full-wave rectifier circuit. Similarly, though not shown, in response to a gate cut-off signal SDN2, all switching elements Q9 to Q14 (see FIG. 2) included in inverter 222 are rendered non-conducting. Therefore, diodes D9 to D14 included in inverter 222 implement a three-phase full-wave rectifier circuit. In converter 210, a switching operation (PWM operation) of switching elements Q1 and Q2 continues in response to control signal PWMC.

During inverterless running control, engine 100 is driven and hence engine torque Te is output from engine 100. Motor-generator 10 mechanically (dynamically) rotates with engine torque Te. Since motor-generator 10 is a permanent magnet synchronous motor, a permanent magnet 12 is provided in a rotor of motor-generator 10. Therefore, as permanent magnet 12 rotates with engine torque Te, a counter-electromotive voltage Vc is generated. When counter-electromotive voltage Vc is higher than system voltage VH, motor current IM1 flows from motor-generator 10 to battery 150 and motor-generator 10 generates electric power. In motor-generator 10, counter-electromotive torque Tc applied in a direction interfering rotation of motor-generator 10 is generated.

Figure 4:
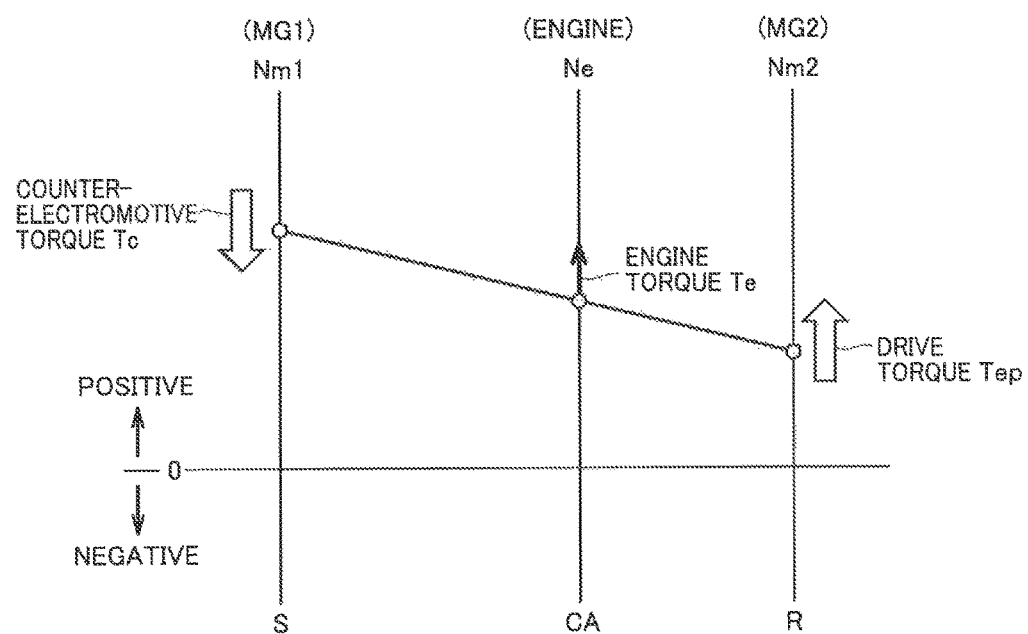
FIG. 4 is a nomographic chart for illustrating a behavior of each rotational element during inverterless running control.

FIG. 4 is a nomographic chart for illustrating a behavior of each rotational element during inverterless running control. As planetary gear mechanism 30 is constructed as described with reference to FIG. 1, a rotation speed of sun gear S (=rotation speed Nm1), a rotation speed of carrier CA (=rotation speed Ne), and a rotation speed of ring gear R (=rotation speed Nm2) have such relation as being connected with a straight line in a nomographic chart.

As described above, when motor-generator 10 mechanically rotates with engine torque Te during inverterless running control, motor-generator 10 generates counter-electromotive torque Tc in a direction interfering rotation of motor-generator 10 (a negative direction). As counter-electromotive torque Tc is applied from motor-generator 10 to sun gear S, drive torque Tep applied in a positive direction as reaction force of counter-electromotive torque Tc is generated in ring gear R. With drive torque Tep, inverterless running of vehicle 1 is realized.

<Dependency of Counter-Electromotive Torque Tc on System Voltage VH>

Figure 5:
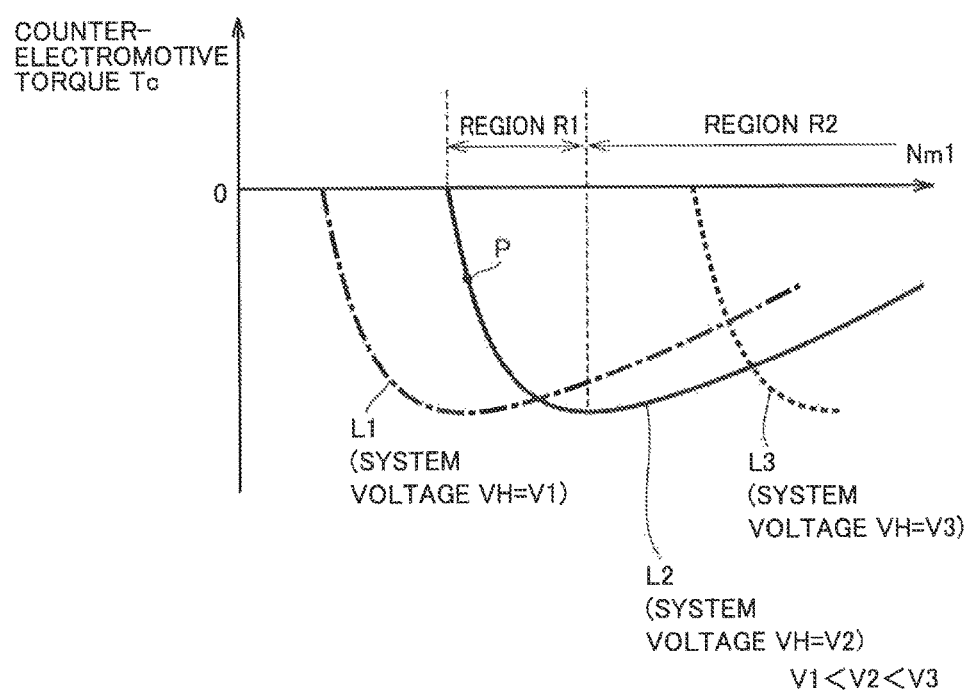
FIG. 5 is a diagram for illustrating dependency of counter-electromotive torque characteristics on a system voltage.

FIG. 5 is a diagram for illustrating dependency of counter-electromotive torque Tc on system voltage VH. In FIG. 5 and FIGS. 7, 8 and 10 which will be described later, the abscissa represents rotation speed Nm1 and the ordinate represents counter-electromotive torque Tc. A curve L1 shows characteristics of counter-electromotive torque Tc when a condition of system voltage VH=V1 is set. A curve L2 shows characteristics of counter-electromotive torque Tc when a condition of system voltage VH=V2 is set (V1<V2). A curve L3 shows characteristics of counter-electromotive torque Tc when a condition of system voltage VH=V3 is set (V1<V2<V3).

As shown with curves L1 to L3, counter-electromotive torque Tc has such characteristics as shifting in the positive direction of rotation speed Nm1 with increase in system voltage VH. In any of curves L1 to L3, when rotation speed Nm1 is higher than a prescribed value, an absolute value of counter-electromotive torque Tc increases with increase in rotation speed Nm1, and the absolute value of counter-electromotive torque Tc is maximized when rotation speed Nm1 reaches a certain value. With further increase in rotation speed Nm1, the absolute value of counter-electromotive torque Tc decreases with increase in rotation speed Nm1.

Figure 6:
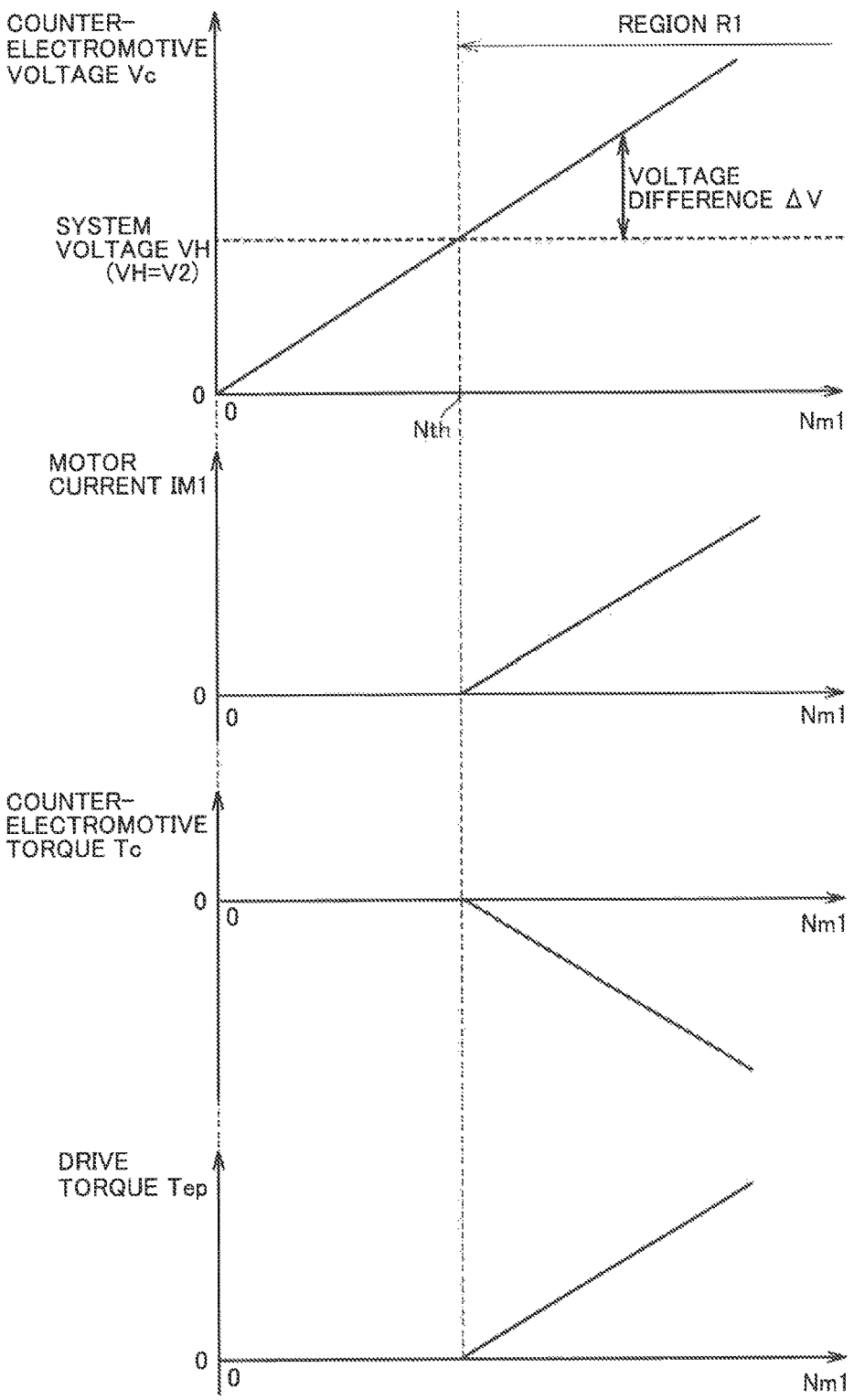
FIG. 6 is a diagram for illustrating in further detail counter-electromotive torque and a mechanism of generation of drive torque based thereon.
Figure 7:
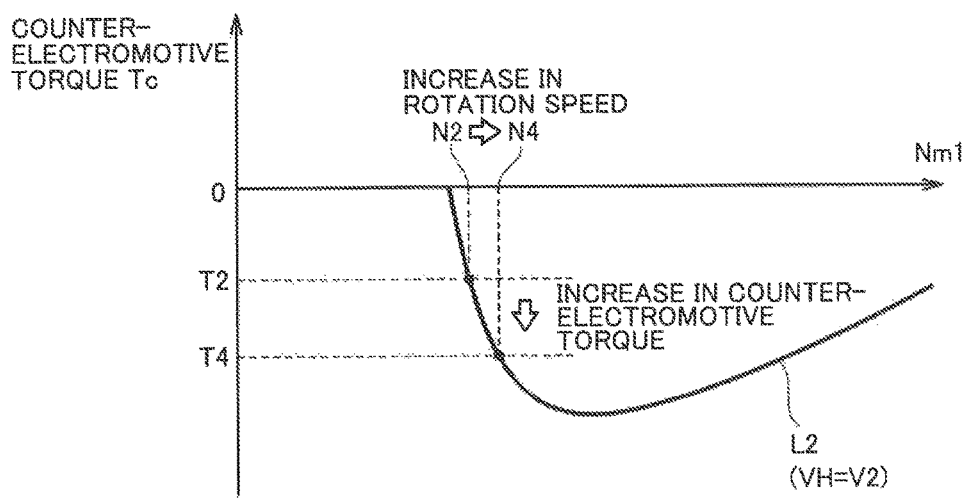
FIG. 7 is a diagram for illustrating control of drive torque based on a rotation speed of an engine.
Figure 8:
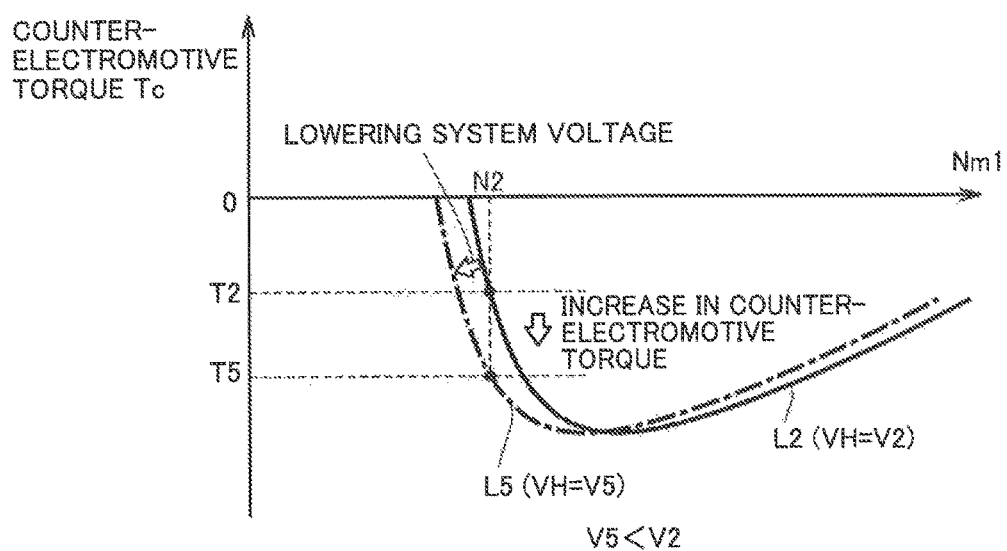
FIG. 8 is a diagram for illustrating control of drive torque based on a system voltage in a region R1.

FIGS. 6 to 8 below illustrate an example in which a condition of system voltage VH=V2 is set and motor-generator 10 operates in a region R1 where an absolute value of counter-electromotive torque Tc increases with increase in rotation speed Nm1 as shown with a point P in FIG. 5.

FIG. 6 is a diagram for illustrating in further detail counter-electromotive torque Tc and a mechanism of generation of drive torque Tep based thereon. In FIG. 6, the abscissa represents rotation speed Nm1. The ordinate represents counter-electromotive voltage Vc, motor current IM1, counter-electromotive torque Tc, and drive torque Tep from above.

As shown in FIG. 6, counter-electromotive voltage Vc has such characteristics as being higher in value with increase in rotation speed Nm1. In a region where rotation speed Nm1 is lower than Nth, counter-electromotive voltage Vc is lower than system voltage VH. When a voltage difference between counter-electromotive voltage Vc and system voltage VH is denoted as ΔV (=Vc−VH), voltage difference ΔV is negative. In this case, motor current IM1 does not flow from motor-generator 10 to battery 150 and motor-generator 10 does not generate electric power. Therefore, counter-electromotive torque Tc is not generated either and drive torque Tep as reaction force of counter-electromotive torque Tc is not generated either.

In region R1 where rotation speed Nm1 is higher than Nth, counter-electromotive voltage Vc is higher than system voltage VH. Therefore, voltage difference ΔV is positive and motor current IM1 flows. As voltage difference ΔV is greater, motor current IM1 is higher. In motor-generator 10, counter-electromotive torque Tc in accordance with voltage difference ΔV is generated and drive torque Tep as reaction force of counter-electromotive torque Tc is applied to output shaft 60.

By using such characteristics of counter-electromotive torque Tc, when requested driving force in vehicle 1 is varied in response to an operation of an accelerator by a user during inverterless running control, drive torque Tep can be controlled by controlling engine 100 to vary rotation speed Ne as will be described below. Such control is hereinafter also referred to as "control of drive torque based on rotation speed Ne."

FIG. 7 is a diagram for illustrating control of drive torque based on rotation speed Ne. When rotation speed Ne of engine 100 is increased with rotation speed Nm2 of motor-generator 20 (in other words, vehicle speed V) being assumed not to vary from a current value, rotation speed Nm1 of motor-generator 10 increases from N2 to N4 based on relation in the nomographic chart (see FIG. 4). Then, an absolute value of counter-electromotive torque Tc increases from T2 to T4 (counter-electromotive torque Tc varies in a negative direction). Consequently, driving force Tep as reaction force of counter-electromotive torque Tc also increases. Though FIG. 7 shows an example of increase in rotation speed Nm1, drive torque Tep can also be decreased by lowering rotation speed Nm1 to the contrary.

Thus, when requested driving force in vehicle 1 is varied in response to an operation of the accelerator by a user during inverterless running control, rotation speed Ne is varied by controlling engine 100 and rotation speed Nm1 is varied thereby, so that magnitude of counter-electromotive torque Tc can be adjusted. Consequently, drive torque Tep as reaction force of counter-electromotive torque Tc can also be adjusted.

In general, mechanical control is often lower in responsiveness than electrical or electronic control. Since variation in rotation speed Ne is brought about by mechanical control accompanied by change in state of combustion in engine 100, it is relatively gradual. Therefore, when requested driving force in vehicle 1 is varied in response to an operation of the accelerator by the user during inverterless running control, sufficient responsiveness cannot be obtained when drive torque is controlled based on rotation speed Ne (that is, rotation speed Ne is adjusted such that drive torque Tep is controlled to produce requested driving force).

In the first embodiment, such a configuration is adopted that counter-electromotive torque Tc is adjusted by controlling converter 210 so as to vary system voltage VH and desired drive torque Tep is thereby applied to output shaft 60. Such control is hereinafter referred to as "control of drive torque based on system voltage VH."

FIG. 8 is a diagram for illustrating control of drive torque based on system voltage VH in region R1. For example, when converter 210 is controlled to lower system voltage VH from V2 to V5 (see a curve LS) while rotation speed Nm1 is constant at N2, an absolute value of counter-electromotive torque Tc increases from T2 to T5. Consequently, drive torque Tep as reaction force of counter-electromotive torque Tc can also increase. Though not shown, when system voltage VH is increased to the contrary, an absolute value of counter-electromotive torque Tc decreases (counter-electromotive torque Tc varies in the positive direction). Consequently, drive torque Te can be lowered.

Thus, according to the first embodiment, when requested driving force in vehicle 1 is varied in response to an operation of the accelerator by the user during inverterless running control, magnitude of counter-electromotive torque Tc can be adjusted by controlling converter 210 so as to raise or lower system voltage VH. When counter-electromotive torque Tc is adjusted, drive torque Tep is also accordingly adjusted. Therefore, drive torque Tep can be controlled to produce requested driving force. This control (control of drive torque based on system voltage VH) is electrical control and higher in responsiveness than mechanical control of engine 100 as described with reference to FIG. 6 (control of drive torque based on rotation speed Ne). Therefore, responsiveness to requested driving force can be improved.

Figure 9:
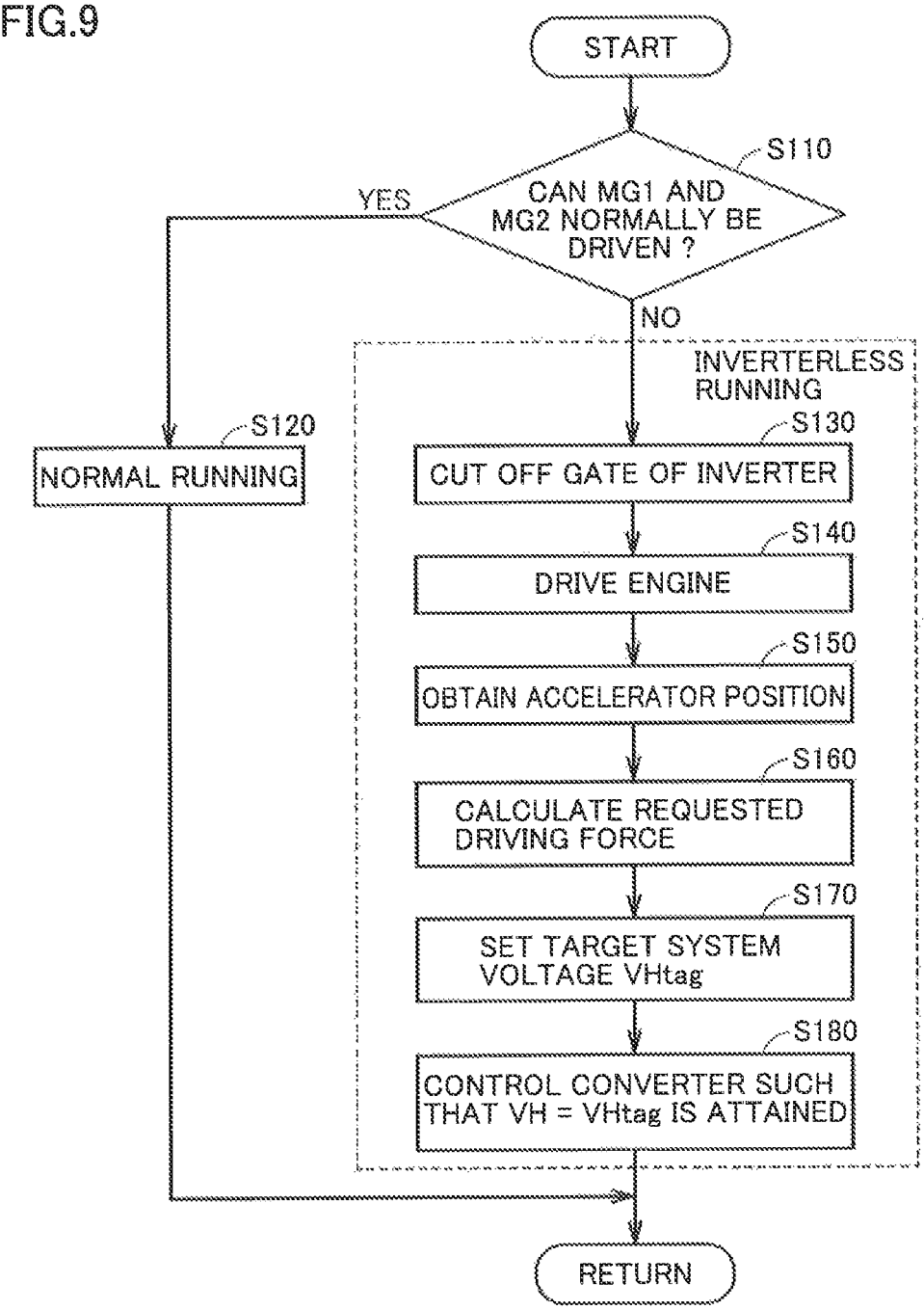
FIG. 9 is a flowchart for illustrating control of running of the hybrid vehicle according to the first embodiment.

FIG. 9 is a flowchart for illustrating control of running of vehicle 1 according to the first embodiment. The flowcharts shown in FIG. 9 and FIG. 11 which will be described later are executed as being called from a main routine when a prescribed condition is satisfied or each time a prescribed period elapses. Though each step (hereinafter abbreviated as S) in the flowchart is basically performed by software processing by ECU 300, it may be performed by hardware processing by using electronic circuits fabricated in ECU 300.

In S110, ECU 300 determines whether or not motor-generators 10 and 20 can normally electrically be driven by inverters 221 and 222. More specifically, ECU 300 determines whether or not failure of a component such as resolvers 421 and 422 or current sensors 241 and 242 has occurred. When motor-generators 10 and 20 can normally be driven (YES in S110), the process proceeds to S120, and ECU 300 sets the control mode to the normal mode and has vehicle 1 carry out normal running. Thereafter, the process returns to the main routine.

When motor-generators 10 and 20 cannot normally be driven (NO in S110), ECU 300 sets the control mode to the limp home mode and has vehicle 1 carry out inverterless running in S130 to S180.

In S130, ECU 300 sets inverters 221 and 222 to the gate cut-off state by outputting gate cut-off signals SDN1 and SDN2 (alternatively, when inverters 221 and 222 have already been in the gate cut-off state, the state is maintained). Inverters 221 and 222 can thus be protected.

In S140, ECU 300 drives engine 100 (alternatively, when engine 100 has already been driven, the state is maintained). Rotation speed Ne is adjusted such that rotation speed Nm1 of motor-generator 10 is constant.

In S150, ECU 300 obtains accelerator position Acc based on a signal from accelerator position sensor 430.

In S160, ECU 300 calculates requested driving force in vehicle 1 based on accelerator position Acc and vehicle speed V. More specifically, ECU 300 holds a map (or a function) showing correspondence between accelerator position Acc and requested driving force for each vehicle speed V in a not-shown memory. ECU 300 calculates requested driving force based on accelerator position Acc by referring to the map.

In S170, ECU 300 sets target system voltage VHtag based on requested driving force calculated in S160. More specifically, ECU 300 calculates drive torque Tep in order to produce requested driving force and further calculates magnitude of counter-electromotive torque Tc for generating drive torque Tep by using relation in the nomographic chart (see FIG. 4). Then, ECU 300 calculates target system voltage VHtag necessary for generating counter-electromotive torque Tc based on a current value of system voltage VH by using relation as shown in FIG. 8.

When requested driving force is 0, target system voltage VHtag is set to a value equal to counter-electromotive voltage Vc. Thus, when system voltage VH is controlled toward target system voltage VHtag to be equal to counter-electromotive voltage Vc, voltage difference ΔV becomes 0. Therefore, counter-electromotive torque Tc becomes 0 and drive torque Tep as reaction force thereof also becomes 0.

When motor-generator 10 is operated in region R1, as requested driving force is higher, target system voltage VHtag is set to be lower. Thus, for example, when system voltage VH lowers in control of system voltage VH toward target system voltage VHtag, an absolute value of counter-electromotive torque Tc increases as described with reference to FIG. 8 and drive torque Tep also increases thereby.

Such relation is stored in advance in the memory of ECU 300 as a map or a function, so that ECU 300 can calculate system voltage VH producing requested driving force as target system voltage VHtag.

In S180, ECU 300 controls converter 210 such that system voltage VH attains to target system voltage VHtag. More specifically, ECU 300 has converter 210 perform a PWM operation by outputting control signal PWMC of duty in accordance with target system voltage VHtag. When the processing in S180 ends, the process returns to the main routine. The processing in S150 to S180 corresponds to control of drive torque based on system voltage VH.

As set forth above, according to the first embodiment, target system voltage VHtag is set to produce requested driving force and converter 210 is electrically controlled such that system voltage VH attains to target system voltage VHtag. Thus, magnitude of drive torque Tep can variably be controlled in accordance with accelerator position Acc. By controlling drive torque Tep by controlling converter 210, responsiveness to requested driving force can be improved as compared with control of drive torque Tep by controlling engine 100 (see FIG. 7).

Though FIGS. 6 to 8 illustrate region R1 (see FIG. 5) where an absolute value of counter-electromotive torque Tc increases with increase in rotation speed Nm1 by way of example, drive torque may be controlled based on system voltage VH in a region R2 where an absolute value of counter-electromotive torque Tc decreases with increase in rotation speed Nm1.

Figure 10:
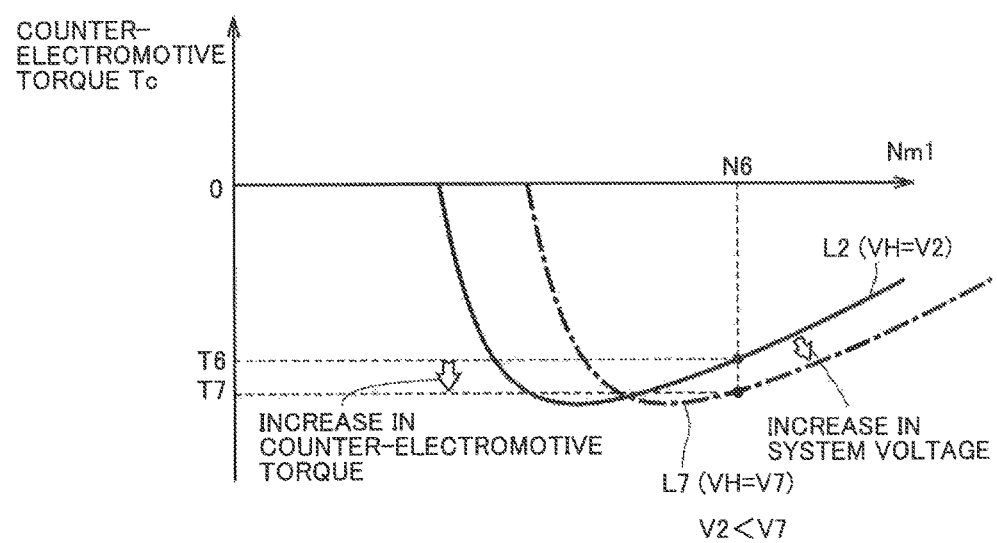
FIG. 10 is a diagram for illustrating control of drive torque by adjustment of a system voltage in a region R2.

FIG. 10 is a diagram for illustrating control of drive torque based on system voltage VH in region R2. As in the description with reference to region R1 (see FIG. 8), a condition of system voltage VH=V2 is set. In region R2, for example, when system voltage VH is raised from V2 to V7 while rotation speed Nm1 is constant at N6, an absolute value of counter-electromotive torque Tc increases from T6 to T7. Consequently, drive torque Tep can be increased. Though not shown, when system voltage VH is lowered to the contrary, an absolute value of counter-electromotive torque Tc decreases and hence drive torque Tep can be decreased.

When motor-generator 10 is operated in region R2, as requested driving force is higher, target system voltage VHtag is set to be higher. Such relation is stored in advance in the memory of ECU 300 as a map or a function, so that ECU 300 can calculate system voltage VH producing requested driving force as target system voltage VHtag.

Second Embodiment

In the first embodiment, a configuration as shown in FIG. 2 in which target system voltage VHtag is transmitted from HV-ECU 310 to MG-ECU 320 and MG-ECU 320 controls converter 210 such that system voltage VH attains to target system voltage VHtag has been described by way of example. When a communication error occurs between HV-ECU 310 and MG-ECU 320, however, target system voltage VHtag cannot be transmitted from HV-ECU 310 to MG-ECU 320.

In the second embodiment, a configuration in which when motor-generators 10 and 20 cannot normally be driven and inverterless running is carried out, contents of control of drive torque are switched depending on whether or not such a defective condition is caused by a communication error will be described. Since an overall configuration of the hybrid vehicle and a configuration of the electric system according to the second embodiment are equivalent to the overall configuration of vehicle 1 and the configuration of the electric system (see FIGS. 1 and 2) according to the first embodiment, respectively, description will not be repeated.

Figure 11:
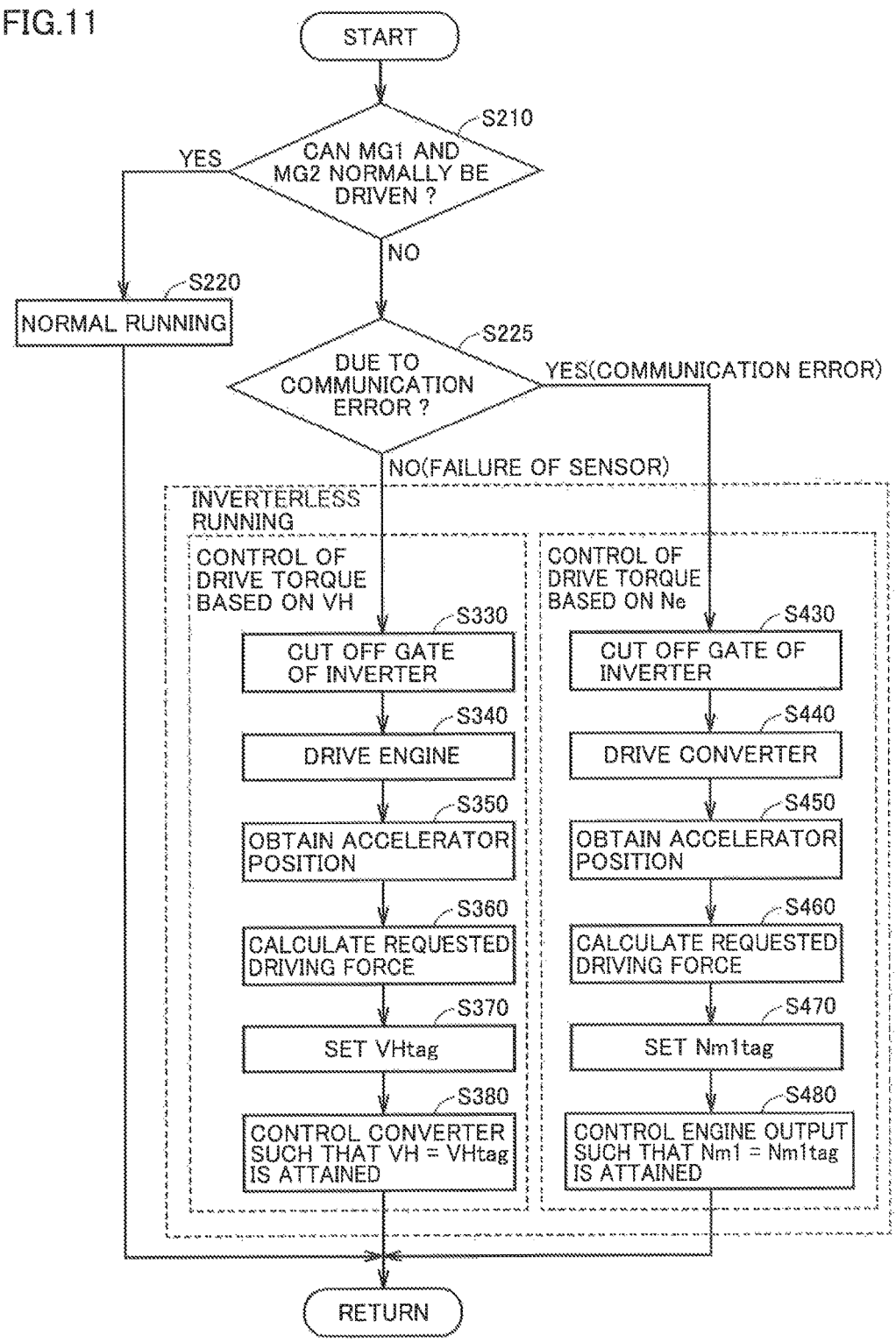
FIG. 11 is a flowchart for illustrating control of running of the hybrid vehicle according to a second embodiment.

FIG. 11 is a flowchart for illustrating control of running of the hybrid vehicle according to the second embodiment. Since the processing in S210 and S220 are equivalent to the processing in S110 and S120 (see FIG. 9) in the first embodiment, description will not be repeated.

When motor-generators 10 and 20 cannot normally be driven by inverters 221 and 222 (NO in S210), HV-ECU 310 determines whether or not such a defective condition is caused by a communication error between HV-ECU 310 and MG-ECU 320 (S225).

When motor-generators 10 and 20 cannot normally be driven but such a defective condition is not caused by a communication error, that is, when inverterless running control is carried out due to failure of a component such as resolvers 421 and 422 or current sensors 241 and 242 (NO in S225), the process proceeds to S330. In S330 to S380, drive torque is controlled based on system voltage VH as in the first embodiment.

More specifically, in S330, HV-ECU 310 outputs a gate cut-off command to MG-ECU 320. MG-ECU 320 sets inverters 221 and 222 to the gate cut-off state (or maintains the inverters in the gate cut-off state) by outputting gate cut-off signals SDN1 and SDN2 to inverters 221 and 222, respectively, in response to the gate cut-off command. In S340, HV-ECU 310 drives engine 100 (maintains the engine in a driven state).

In S350, HV-ECU 310 obtains accelerator position Acc based on a signal from accelerator position sensor 430. HV-ECU 310 calculates requested driving force in vehicle 1 based on accelerator position Acc and vehicle speed V (S360).

In S370, HV-ECU 310 sets target system voltage VHtag based on calculated requested driving force. Set target system voltage VHtag is transmitted to MG-ECU 320. MG-ECU 320 controls converter 210 such that a current value of system voltage VH attains to target system voltage VHtag (S380). Thereafter, the process returns to the main routine.

When motor-generators 10 and 20 cannot normally be driven and such a defective condition is caused by a communication error (YES in S225), the process proceeds to S430. In S430 to S480, drive torque is controlled based on rotation speed Ne. Determination as "YES" is made in the processing in S225 in both of cases when inverterless running control is started because of occurrence of a communication error and when a communication error additionally occurs during inverterless running control due to failure of resolvers 421 and 422.

When a communication error occurs, MG-ECU 320 sets in S430, inverters 221 and 222 to the gate cut-off state (or maintains the inverters in the gate cut-off state) by outputting gate cut-off signals SDN1 an SDN2 to inverters 221 and 222, respectively, without receiving a gate cut-off command from HV-ECU 310.

In S440, MG-ECU 320 drives converter 210 (or maintains the converter in a driven state). Though MG-ECU 320 cannot receive target system voltage VHtag from HV-ECU 310, it maintains system voltage VH at a constant value lower than counter-electromotive voltage Vc.

In S450, HV-ECU 310 obtains accelerator position Acc based on a signal from accelerator position sensor 430. HV-ECU 310 further calculates requested driving force in vehicle 1 based on accelerator position Acc and vehicle speed V (S460).

In S470, HV-ECU 310 sets a target rotation speed Nm1tag of motor-generator 10 based on requested driving force calculated in S460. More specifically, HV-ECU 310 calculates drive torque Tep for producing the requested driving force and further calculates magnitude of counter-electromotive torque Tc for generating drive torque Tep based on relation in the nomographic chart (see FIG. 4). Then, ECU 300 calculates rotation speed Nm1 of motor-generator 10 necessary for generating counter-electromotive torque Tc, for example, by using relation as shown in FIG. 7.

In S480, HV-ECU 310 controls an operation point (more particularly, rotation speed Ne) of engine 100 such that rotation speed Nm1 attains to target rotation speed Nm1tag by using relation in the nomographic chart.

More specifically, as described with reference to FIGS. 5 and 6, in region R1, with increase in target rotation speed Nm1tag of motor-generator 10 (when vehicle speed V is constant, with increase in target rotation speed Netag of engine 100), an absolute value of counter-electromotive torque Tc increases and hence drive torque Tep also increases. In region R2, with increase in target rotation speed Nm1tag of motor-generator 10, an absolute value of counter-electromotive torque Tc decreases and hence drive torque Tep also decreases.

Such relation is stored in advance in the memory of HV-ECU 310 as a map or a function, so that HV-ECU 310 can calculate target rotation speed Nm tag producing requested driving force.

As set forth above, according to the second embodiment, when motor-generators 10 and 20 cannot normally be driven and inverterless running control is carried out, contents of control of drive torque are switched depending on whether or not a communication error has occurred. When a communication error has not occurred, drive torque is controlled based on system voltage VH and hence responsiveness to requested driving force can be improved. When a communication error has occurred, drive torque is controlled based on rotation speed Ne. Thus, since inverterless running can continue in spite of occurrence of a communication error, a vehicle can run with the limp home function to a location desired by a user more reliably than in the first embodiment.

Modification of Second Embodiment

Though FIG. 2 shows the configuration in which ECU 300 includes two units, the configuration is merely by way of example and another configuration can also be adopted. In a modification of the second embodiment, a configuration in which an engine ECU for controlling engine 100 is separately provided will be described.

Figure 12:
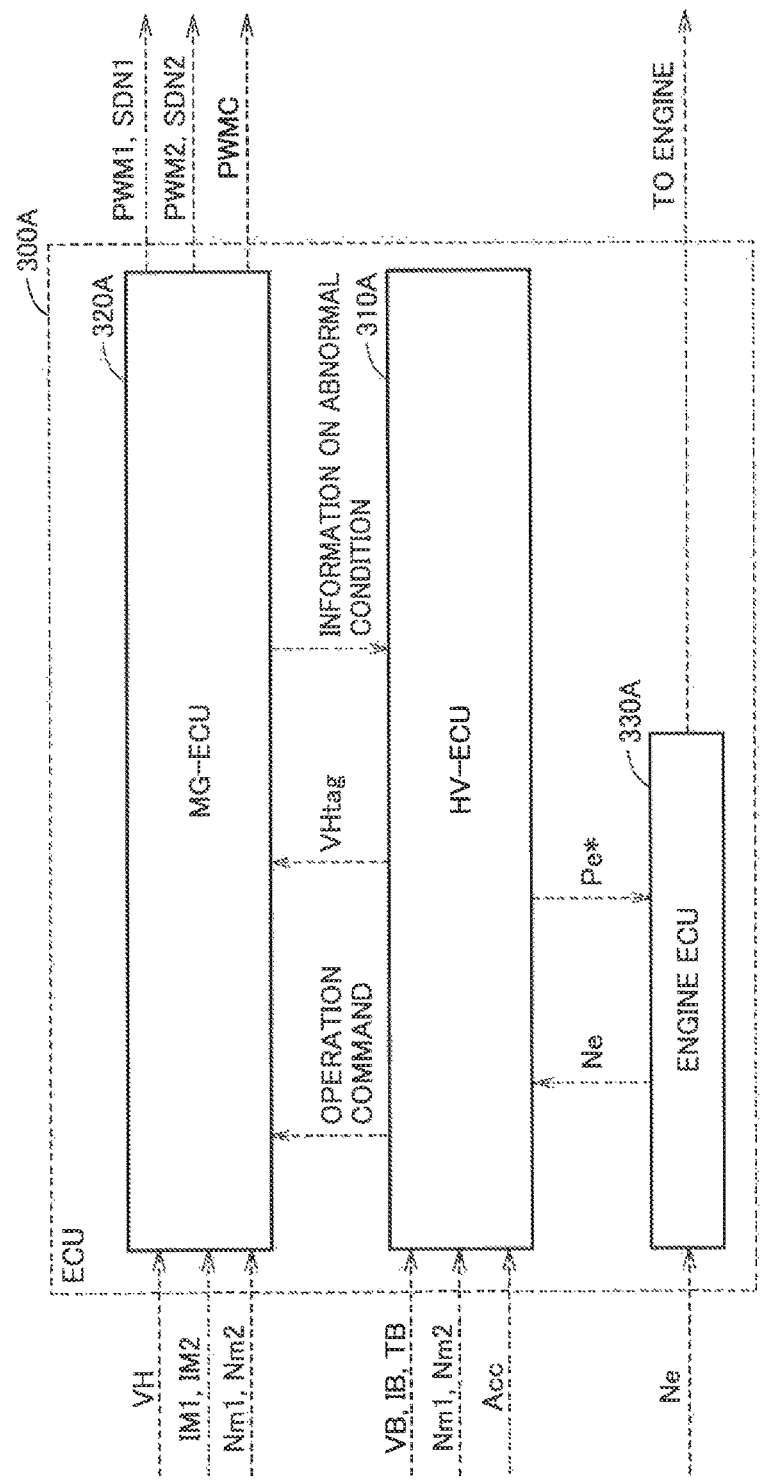
FIG. 12 is a diagram showing an exemplary configuration of an ECU in a modification of the second embodiment.

FIG. 12 is a diagram showing an exemplary configuration of an ECU in the modification of the second embodiment. An ECU 300A includes an HV-ECU 310A, an MG-ECU 320A, and an engine ECU 330A. MG-ECU 320A is equivalent to MG-ECU 320 in the second embodiment.

HV-ECU 310A calculates requested driving force in vehicle 1 based on accelerator position Acc and vehicle speed V. HV-ECU 310A determines requested engine power Pe* based on requested driving force and outputs a signal indicating the value to engine ECU 330A.

Upon receiving rotation speed Ne from engine rotation speed sensor 410, engine ECU 330A outputs a value thereof to HV-ECU 310A. Engine ECU 330A controls fuel injection, ignition timing, and valve timing of engine 100 such that engine 100 is driven at an operation point determined based on requested engine power Pe* determined by HV-ECU 310A.

When ECU300A is configured as above as well, by performing processing as in the flowchart shown in FIG. 11, inverterless running can continue even though a communication error occurs.

In the second embodiment, HV-ECU 310 corresponds to the "first control unit" according to the present invention and MG-ECU 320 corresponds to the "second control unit" according to the present invention. In the modification of the second embodiment, HV-ECU 310A and engine ECU 330A correspond to the "first control unit" according to the present invention and MG-ECU 320A corresponds to the "second control unit" according to the present invention.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A hybrid vehicle comprising:
    an engine;
    a first rotating electric machine including a permanent magnet in a rotor;
    an output shaft connected to a drive wheel;
    a planetary gear mechanism configured to mechanically couple the engine, the first rotating electric machine, and the output shaft to one another and to transmit torque among the engine, the first rotating electric machine, and the output shaft;
    a second rotating electric machine connected to the output shaft;
    a battery;
    a converter configured to output a boosted voltage which results from boost of a voltage input from the battery;
    an inverter configured to convert power among the converter, the first rotating electric machine, and the second rotating electric machine; and
    a controller configured to carry out inverterless running control when the first and second rotating electric machines cannot normally be driven by the inverter,
    the inverterless running control being control in which the inverter is set to a gate cut-off state, the engine is driven to mechanically rotate the first rotating electric machine and to generate in the first rotating electric machine, braking torque in accordance with a difference between a counter-electromotive voltage of the first rotating electric machine and the boosted voltage, and the hybrid vehicle is run with drive torque applied to the output shaft as reaction force of the braking torque,
    the controller controlling the drive torque to produce driving force determined by an accelerator position by raising or lowering the boosted voltage during the inverterless running control.

2. The hybrid vehicle according to claim 1, wherein
    the controller includes a first control unit configured to control the engine and a second control unit configured to control the converter, and
    during the inverterless running control, the second control unit controls the drive torque to produce driving force determined by the accelerator position by raising or lowering the boosted voltage when communication between the first control unit and the second control unit is normal, whereas the first control unit controls the drive torque to produce driving force determined by the accelerator position by adjusting an operation point of the engine when the communication is not normal.

3. A method for controlling a hybrid vehicle, the hybrid vehicle including an engine, a first rotating electric machine including a permanent magnet in a rotor, an output shaft connected to a drive wheel, a planetary gear mechanism configured to mechanically couple the engine, the first rotating electric machine, and the output shaft to one another and to transmit torque among the engine, the first rotating electric machine, and the output shaft, a second rotating electric machine connected to the output shaft, a battery, a converter configured to output a boosted voltage which results from boost of a voltage input from the battery, and an inverter configured to convert power among the converter, the first rotating electric machine, and the second rotating electric machine, the method comprising:
    carrying out inverterless running control when the first and second rotating electric machines cannot normally be driven by the inverter,
    the inverterless running control being control in which the inverter is set to a gate cut-off state, the engine is driven to mechanically rotate the first rotating electric machine and to generate in the first rotating electric machine, braking torque in accordance with a difference between a counter-electromotive voltage of the first rotating electric machine and the boosted voltage, and the hybrid vehicle is run with drive torque applied to the output shaft as reaction force of the braking torque, and
    the carrying out inverterless running control including controlling the drive torque to produce driving force determined by an accelerator position by raising or lowering the boosted voltage.

* * * * *